United States Patent
Shao

(10) Patent No.: US 12,008,556 B2
(45) Date of Patent: Jun. 11, 2024

(54) METHOD AND APPARATUS FOR EXECUTING SMART CONTRACT

(71) Applicant: Jingdong Technology Information Technology Co., Ltd., Beijing (CN)

(72) Inventor: Zhuguang Shao, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 223 days.

(21) Appl. No.: 17/630,647

(22) PCT Filed: Mar. 3, 2020

(86) PCT No.: PCT/CN2020/077569
§ 371 (c)(1),
(2) Date: Jan. 27, 2022

(87) PCT Pub. No.: WO2021/056968
PCT Pub. Date: Apr. 1, 2021

(65) Prior Publication Data
US 2022/0261797 A1    Aug. 18, 2022

(30) Foreign Application Priority Data
Sep. 24, 2019  (CN) .......................... 201910904191.7

(51) Int. Cl.
*G06Q 20/00* (2012.01)
*G06Q 20/06* (2012.01)
(Continued)

(52) U.S. Cl.
CPC ....... *G06Q 20/3825* (2013.01); *G06Q 20/065* (2013.01); *G06Q 20/401* (2013.01);
(Continued)

(58) Field of Classification Search
None
See application file for complete search history.

(56) References Cited

U.S. PATENT DOCUMENTS 4,052,784 A    10/1977  Diepers et al.
10,102,265 B1 *  10/2018  Madisetti ................ G06F 16/27
(Continued)

FOREIGN PATENT DOCUMENTS

CA      2995177 A      8/2019
CN    106874087 A      6/2017
(Continued)

OTHER PUBLICATIONS

Feng; Smart Contract Model for Complex Reality Transactions; IJCS; 14 pages; 2019.*
(Continued)

*Primary Examiner* — Radu Andrei
(74) *Attorney, Agent, or Firm* — BLANK ROME LLP

(57) ABSTRACT

A method and apparatus for executing a smart contract are provided. The method includes: in response to determining that a preset execution moment for executing a smart contract is reached, determining whether a transaction to be executed sent by another node in a blockchain system and used for executing the smart contract has been received; in response to determining that said transaction submitted by the another node has not been received, generating a transaction to be executed corresponding to the current node, and sending said generated transaction to the blockchain system; performing consensus with the another node on said transaction corresponding to the smart contract; and obtaining and executing the smart contract according to said transaction on which the consensus is performed.

13 Claims, 5 Drawing Sheets

(51) Int. Cl.
  *G06Q 20/38* (2012.01)
  *G06Q 20/40* (2012.01)
  *H04L 9/00* (2022.01)

(52) U.S. Cl.
  CPC ........... *H04L 9/50* (2022.05); *G06Q 2220/00* (2013.01); *H04L 2209/463* (2013.01); *H04L 2209/56* (2013.01)

(56) References Cited

U.S. PATENT DOCUMENTS

| | | | |
|---|---|---|---|
| 10,250,394 B1* | 4/2019 | Borne-Pons | G06F 21/64 |
| 11,016,961 B2 | 5/2021 | Qiu | |
| 11,055,703 B2 | 7/2021 | Kondo | |
| 11,102,001 B2 | 8/2021 | Sato | |
| 2019/0005469 A1* | 1/2019 | Dhupkar | H04L 9/3236 |
| 2019/0018888 A1* | 1/2019 | Madisetti | H04L 9/0637 |
| 2019/0228389 A1* | 7/2019 | Hu | H04L 9/0637 |
| 2019/0251078 A1* | 8/2019 | Yan | H04L 9/3239 |
| 2019/0251079 A1* | 8/2019 | Yan | G06F 16/27 |
| 2019/0251563 A1* | 8/2019 | Yan | H04L 9/14 |
| 2019/0349188 A1* | 11/2019 | Guo | H04L 67/1097 |
| 2020/0004737 A1* | 1/2020 | Qiu | G06F 16/245 |
| 2020/0004788 A1* | 1/2020 | Qiu | G06F 16/9014 |
| 2020/0007544 A1* | 1/2020 | Wang | H04L 9/3297 |
| 2020/0019421 A1* | 1/2020 | Sun | H04L 9/50 |
| 2020/0084046 A1* | 3/2020 | Bessonov | H04L 9/321 |
| 2020/0117493 A1* | 4/2020 | Wang | H04L 9/0844 |
| 2020/0133926 A1* | 4/2020 | Sun | G06F 16/1837 |
| 2020/0143937 A1* | 5/2020 | Wolber | G06Q 30/0607 |
| 2020/0183757 A1* | 6/2020 | Liu | G06F 16/27 |
| 2020/0311050 A1* | 10/2020 | Sun | G06F 9/45558 |
| 2020/0334204 A1* | 10/2020 | Irazabal | G06F 16/1837 |
| 2020/0342456 A1* | 10/2020 | Krishnaswamy | H04L 9/0891 |
| 2021/0109849 A1 | 4/2021 | Hsieh et al. | |
| 2021/0133702 A1* | 5/2021 | Liu | G06Q 40/12 |
| 2021/0250164 A1* | 8/2021 | Feng | G06F 21/645 |
| 2022/0284011 A1* | 9/2022 | Qian | G06F 16/2343 |

FOREIGN PATENT DOCUMENTS

| | | |
|---|---|---|
| CN | 108510251 A | 9/2018 |
| CN | 108665953 A | 10/2018 |
| CN | 108805562 A | 11/2018 |
| CN | 108830606 A | 11/2018 |
| CN | 109003078 A | 12/2018 |
| CN | 109146490 A | 1/2019 |
| CN | 109508915 A | 3/2019 |
| CN | 109508915 A | 3/2019 |
| CN | 109615517 A | 4/2019 |
| CN | 109658249 A | 4/2019 |
| CN | 109685502 A | 4/2019 |
| CN | 110033244 A | 7/2019 |
| CN | 110046523 A | 7/2019 |
| CN | 110096338 A | 8/2019 |
| CN | 110659907 A | 1/2020 |
| JP | 2018-128723 A | 8/2018 |
| JP | 2019-008791 A | 1/2019 |
| JP | 6526299 B1 | 6/2019 |

OTHER PUBLICATIONS

Galieva; Logical Methods for Smart Contract Development; IM-CECIS; pp. 881-885; 2019.*
Gao; Scalable Blockchain Based Smart Contract Execution; ICPDS; pp. 352-359; 2017.*
Wohrer; Smart contracts_ security patterns in the ethereum ecosystem and solidity; IWBOSE 17 pages; 2018.*
International Search Report for PCT/CN2020/077569, dated Jun. 1, 2020, 2 pages.
Chinese Office Action for CN201910904191.7, dated Aug. 26, 2020, 9 pgs.
Chinese Office Action for CN201910904191.7, dated Nov. 13, 2020, 12 pgs.
P. Danzi, et al., "Analysis of the Communication Traffic for Blookchain Synchronization of IoT Devices", IEEE, 2018, 7 pgs.
Yan Zhu et al., Smart Contract Execution System over Blockchain Based on Secure Multi-party Computation, Journal of Cryptologic Research, 2019, 6(2): pp. 246-257.

* cited by examiner

200

```
┌─────────────────────────────────────────────────────────────┐
│ Determining, in response to determining that a preset       │
│ executing moment for executing a smart contract is reached, │─201
│ whether a to-be-executed transaction sent by another node   │
│ in a blockchain system where a current node is located and  │
│ used for executing the smart contract has been received     │
└─────────────────────────────────────────────────────────────┘
                              │
                              ▼
┌─────────────────────────────────────────────────────────────┐
│ In response to determining that the to-be-executed          │
│ transaction submitted by the another node has not been      │─202
│ received, generating a to-be-executed transaction           │
│ corresponding to the current node, and sending the generated│
│ to-be-executed transaction to the blockchain system         │
└─────────────────────────────────────────────────────────────┘
                              │
                              ▼
┌─────────────────────────────────────────────────────────────┐
│ Performing consensus with the another node on the to-be-    │─203
│ executed transaction corresponding to the smart contract    │
└─────────────────────────────────────────────────────────────┘
                              │
                              ▼
┌─────────────────────────────────────────────────────────────┐
│ Obtaining and executing the smart contract according to the │─204
│ to-be-executed transaction on which the consensus is        │
│ performed                                                   │
└─────────────────────────────────────────────────────────────┘
```

Fig. 2

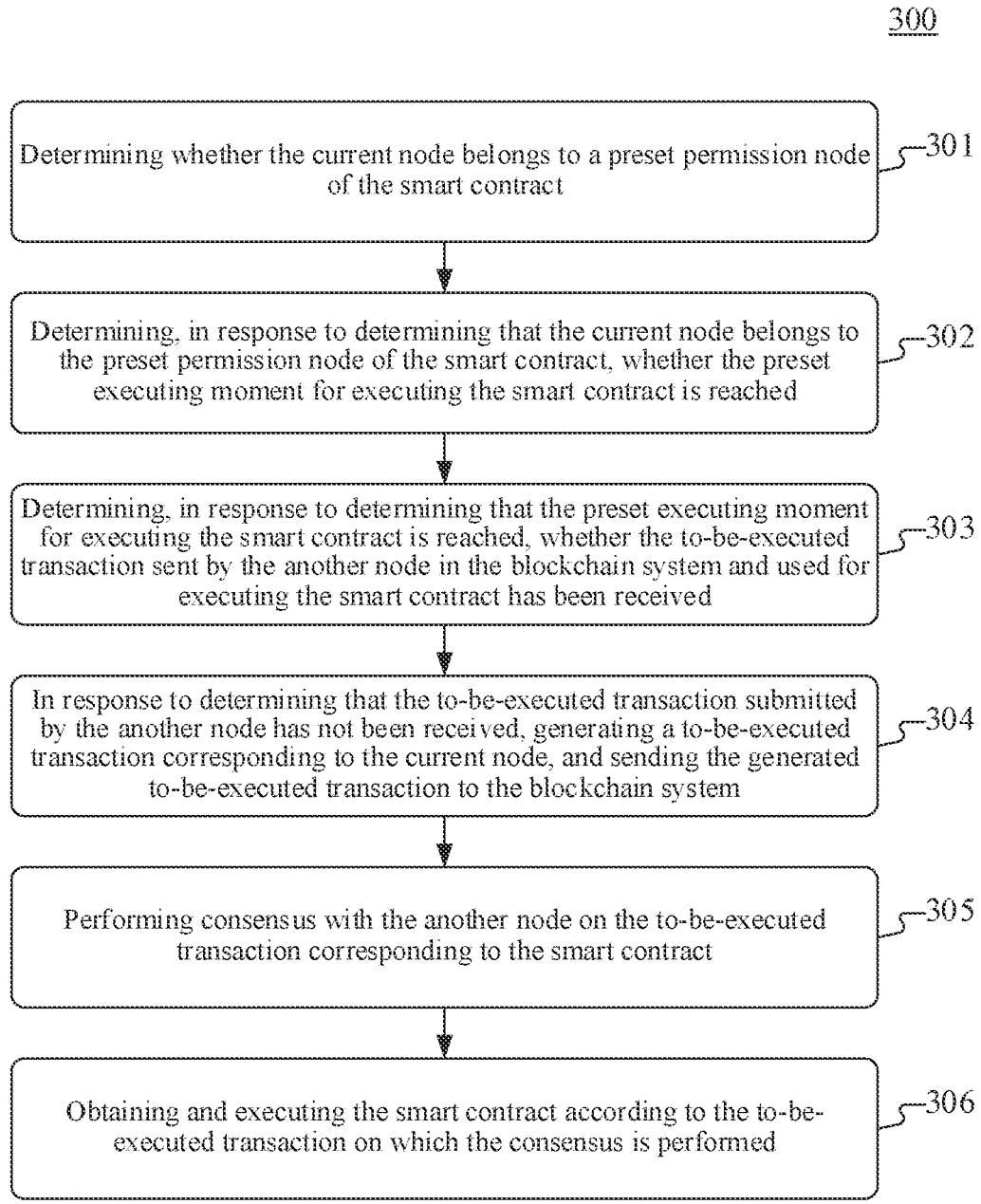

METHOD AND APPARATUS FOR EXECUTING SMART CONTRACT

RELATED APPLICATIONS

This patent application is a U.S. National Stage of International Application No. PCT/CN2020/077569, filed on Mar. 3, 2020, which claims benefit of priority to Chinese Patent Application No. 201910904191.7, filed on Sep. 24, 2019, and entitled "Method and apparatus for executing smart contract," the entire disclosures of which are incorporated herein by reference in their entities.

TECHNICAL FIELD

Embodiments of the present disclosure relate to the field of computer technology, and in particular to a method and apparatus for executing a smart contract.

BACKGROUND

A smart contract is a computer protocol designed to spread, verify, or execute a contract in an information-based way. Smart contracts allow for trusted transactions without a third party, which are traceable and irreversible.

At present, many smart contracts usually need to be executed regularly. Since nodes in a blockchain system have their own independent clocks, it is difficult for the nodes to maintain clock synchronization. Therefore, it is difficult for the blockchain system itself to control the synchronization of the execution of smart contracts by the nodes.

Typically, a business system calls the blockchain system to execute a smart contract at the executing moment for executing the smart contract to ensure the synchronization of the execution of the smart contract by each node in the blockchain system.

SUMMARY

Embodiments of the present disclosure propose a method and apparatus for executing a smart contract.

In a first aspect, an embodiment of the present disclosure provides a method for executing a smart contract. The method includes: determining, in response to determining that a preset executing moment for executing a smart contract is reached, whether a to-be-executed transaction sent by another node in a blockchain system where a current node is located and used for executing the smart contract has been received; in response to determining that the to-be-executed transaction submitted by the another node has not been received, generating a to-be-executed transaction corresponding to the current node, and sending the generated to-be-executed transaction to the blockchain system; performing consensus with the another node on the to-be-executed transaction corresponding to the smart contract; and obtaining and executing the smart contract according to the to-be-executed transaction on which the consensus is performed.

In some embodiments, the determining, in response to determining that a preset executing moment for executing a smart contract is reached, whether a to-be-executed transaction sent by another node in a blockchain system where a current node is located and used for executing the smart contract has been received, includes: determining whether the current node belongs to a preset permission node of the smart contract; determining, in response to determining that the current node belongs to the preset permission node of the smart contract, whether the preset executing moment for executing the smart contract is reached; and determining, in response to determining that the preset executing moment for executing the smart contract is reached, whether the to-be-executed transaction sent by the another node in the blockchain system and used for executing the smart contract has been received.

In some embodiments, the sending the generated to-be-executed transaction to the blockchain system, includes: sending the generated to-be-executed transaction to a non-permission node in the blockchain system, to cause the non-permission node to execute following operations: determining whether the node sending the to-be-executed transaction belongs to the preset permission node of the smart contract; in response to determining that the node sending the to-be-executed transaction belongs to the preset permission node of the smart contract, determining whether the to-be-executed transaction sent by the another node in the blockchain system has been received, and/or whether the consensus has been performed with the another node on the to-be-executed transaction corresponding to the smart contract; sending, in response to determining that the to-be-executed transaction submitted by the another node has not been received, and/or determining that the consensus has not been performed with the another node on the to-be-executed transaction corresponding to the smart contract, the received to-be-executed transaction to the blockchain system; and performing consensus with the another node on the to-be-executed transaction corresponding to the smart contract.

In some embodiments, performing the to-be-executed transaction on which the consensus is performed to record the to-be-executed transaction on which the consensus is performed.

In some embodiments, the to-be-executed transaction includes signature information of the node that generates the to-be-executed transaction; and the performing the to-be-executed transaction on which the consensus is performed to record the to-be-executed transaction on which the consensus is performed, includes: deleting the signature information in the to-be-executed transaction on which the consensus is performed, and executing the to-be-executed transaction on which the consensus is performed with the signature information deleted, to record the to-be-executed transaction on which the consensus is performed with the signature information deleted.

In some embodiments, the method further includes: receiving a submission transaction for submitting the smart contract, where the submission transaction includes the preset executing moment for executing the smart contract; determining whether the submission transaction is an abnormal submission transaction; ending, in response to determining that the submission transaction is not an abnormal submission transaction, the submission transaction to the blockchain system; performing consensus with the another node on the submission transaction corresponding to the smart contract; and performing the submission transaction on which the consensus is performed to record the submission transaction on which the consensus is performed.

In some embodiments, the submission transaction further includes at least one of: the smart contract, a contract identifier for identifying the smart contract, preset permission node information, a preset number of times of execution, or a preset execution time interval.

In a second aspect, an embodiment of the present disclosure provides an apparatus for executing a smart contract. The apparatus includes: a determination unit, configured to determine, in response to determining that a preset executing moment for executing a smart contract is reached, whether a to-be-executed transaction sent by another node in a blockchain system where a current node is located and used for executing the smart contract has been received; a generation unit, configured to, in response to determining that the to-be-executed transaction submitted by the another node has not been received, generate a to-be-executed transaction corresponding to the current node, and send the generated to-be-executed transaction to the blockchain system; a consensus unit, configured to perform consensus with the another node on the to-be-executed transaction corresponding to the smart contract; and an execution unit, configured to obtain and execute the smart contract according to the to-be-executed transaction on which the consensus is performed.

In some embodiments, the determination unit is further configured to: determine whether the current node belongs to a preset permission node of the smart contract; determine, in response to determining that the current node belongs to the preset permission node of the smart contract, whether the preset executing moment for executing the smart contract is reached; and determine, in response to determining that the preset executing moment for executing the smart contract is reached, whether the to-be-executed transaction sent by the another node in the blockchain system and used for executing the smart contract has been received.

In some embodiments, the generation unit is further configured to: send the generated to-be-executed transaction to a non-permission node in the blockchain system, to cause the non-permission node to execute following operations: determining whether the node sending the to-be-executed transaction belongs to the preset permission node of the smart contract; in response to determining that the node sending the to-be-executed transaction belongs to the preset permission node of the smart contract, determining whether the to-be-executed transaction sent by the another node in the blockchain system has been received, and/or whether the consensus has been performed with the another node on the to-be-executed transaction corresponding to the smart contract; sending, in response to determining that the to-be-executed transaction submitted by the another node has not been received, and/or determining that the consensus has not been performed with the another node on the to-be-executed transaction corresponding to the smart contract, the received to-be-executed transaction to the blockchain system; and performing consensus with the another node on the to-be-executed transaction corresponding to the smart contract.

In some embodiments, the execution unit is further configured to: perform the to-be-executed transaction on which the consensus is performed to record the to-be-executed transaction on which the consensus is performed.

In some embodiments, the to-be-executed transaction includes signature information of the node that generates the to-be-executed transaction; and the execution unit is further configured to: delete the signature information in the to-be-executed transaction on which the consensus is performed, and execute the to-be-executed transaction on which the consensus is performed with the signature information deleted, to record the to-be-executed transaction on which the consensus is performed with the signature information deleted.

In some embodiments, the apparatus further includes: a receiving unit, configured to receive a submission transaction for submitting the smart contract, where the submission transaction includes the preset executing moment for executing the smart contract; the determination unit is further configured to: determine whether the submission transaction is an abnormal submission transaction; the apparatus further includes a sending unit, configured to send, in response to determining that the submission transaction is not an abnormal submission transaction, the submission transaction to the blockchain system; the consensus unit is further configured to: perform consensus with the another node on the submission transaction corresponding to the smart contract; and the execution unit is further configured to: perform the submission transaction on which the consensus is performed to record the submission transaction on which the consensus is performed.

In some embodiments, the submission transaction further includes at least one of: the smart contract, a contract identifier for identifying the smart contract, preset permission node information, a preset number of times of execution, or a preset execution time interval.

In a third aspect, an embodiment of the present disclosure provides an electronic device, which includes: one or more processors; and a storage apparatus storing one or more programs thereon, where the one or more programs, when executed by the one or more processors, cause the one or more processors to implement the method as described in any implementation in the first aspect.

In a fourth aspect, an embodiment of the present disclosure provides a computer-readable medium storing a computer program thereon, where the computer program, when executed by a processor, implements the method as described in any one implementation in the first aspect.

BRIEF DESCRIPTION OF THE DRAWINGS

By reading the detailed description of non-limiting embodiments with reference to the following accompanying drawings, other features, objects and advantages of the present disclosure will become more apparent.

FIG. 2 is a flowchart of an embodiment of a method for executing a smart contract according to the present disclosure;

FIG. 3 is a flowchart of another embodiment of the method for executing a smart contract according to the present disclosure;

DETAILED DESCRIPTION OF EMBODIMENTS

Embodiments of the present disclosure will be further described below in detail in combination with the accompanying drawings. It should be appreciated that detailed embodiments described herein are merely used for explaining the relevant invention, rather than limiting the invention. In addition, it should be noted that, for the ease of description, only the parts related to the relevant invention are shown in the accompanying drawings.

It should be noted that embodiments in the present disclosure and the features in embodiments may be combined with each other on a non-conflict basis. Embodiments of the present disclosure will be described below in detail with reference to the accompanying drawings.

Figure 1:
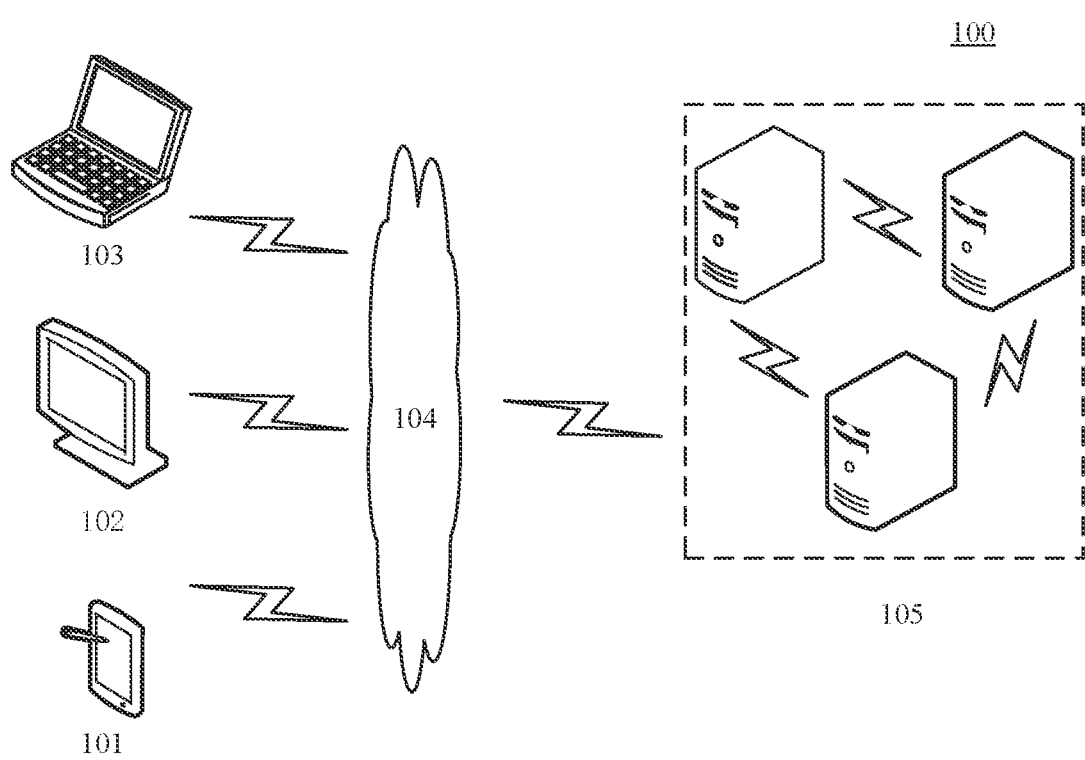
FIG. 1 is an exemplary system architecture diagram to which an embodiment of the present disclosure may be applied.

FIG. 1 shows an exemplary architecture 100 to which an embodiment of a method for executing a smart contract or an apparatus for executing a smart contract of the present disclosure may be applied.

As shown in FIG. 1, the system architecture 100 may include terminal devices 101, 102, 103, a network 104 and a blockchain system 105. The blockchain system 105 may include one or more nodes, and the nodes may be communicatively connected. The network 104 serves as a medium for providing a communication link between the terminal devices 101, 102, 103 and the blockchain system 105. The network 104 may include various types of connections, such as wired or wireless communication links, or optical fiber cables.

The terminal devices 101, 102, and 103 may be hardware or software. When the terminal devices 101, 102, 103 are hardware, they may be various electronic devices, including but not limited to smart phones, tablet computers, E-book readers, laptop computers, desktop computers, and so on. When the terminal devices 101, 102, 103 are software, they may be installed in the electronic devices listed above. They may be implemented as a plurality of software or software modules (for example, a plurality of software or software modules used to provide distributed services), or as a single software or software module, which is not limited herein.

The one or more nodes in the blockchain system 105 may provide various services, for example, may receive a related transaction of a smart contract submitted on the terminal devices 101, 102, 103, and complete the execution of the smart contract.

It should be noted that the method for executing a smart contract provided by the embodiments of the present disclosure is generally performed by the node in the blockchain system 105. Correspondingly, the apparatus for executing a smart contract is generally provided in the node in the blockchain system 105.

It should be noted that the nodes in the blockchain system 105 may be a single server, or may be composed of a plurality of servers or a plurality of server clusters. The server may be hardware or software. When the server is hardware, it may be implemented as a distributed server cluster composed of a plurality of servers, or as a single server. When the server is software, it may be implemented as a plurality of software or software modules (for example, a plurality of software or software modules used to provide distributed services), or as a single software or software module, which is not limited herein.

It should be appreciated that the number of the terminal devices, the network and the blockchain system in FIG. 1 is merely illustrative. Any number of terminal devices, networks and blockchain systems may be provided according to actual requirements.

With further reference to FIG. 2, illustrating a flow 200 of an embodiment of a method for executing a smart contract according to the present disclosure. The method for executing a smart contract includes the following steps.

Step 201, determining, in response to determining that a preset executing moment for executing a smart contract is reached, whether a to-be-executed transaction sent by another node in a blockchain system where a current node is located and used for executing the smart contract has been received.

In the present embodiment, an executing body of the method for executing a smart contract (the node in the blockchain system 105 as shown in FIG. 1) may pre-store a corresponding relationship between the smart contract and an executing moment corresponding to the smart contract locally. In this regard, the executing body may poll whether it is the executing moment for executing the smart contract according to a preset time interval.

In the present embodiment, the executing body of the method for executing a smart contract (the node in the blockchain system 105 as shown in FIG. 1) may determine whether the to-be-executed transaction sent by the another node in the blockchain system and used for executing the smart contract has been received by viewing locally stored information.

For example, the executing body may store instruction information used to indicate whether the to-be-executed transaction sent by the another node and used for executing the smart contract has been received. In this regard, by viewing the instruction information, it may be determined whether the instruction information of the to-be-executed transaction sent by the another node and used for executing the smart contract has been received.

As another example, the executing body may store a corresponding relationship between the received to-be-executed transaction sent by the another node and used for executing the smart contract and the smart contract. In this regard, by viewing whether the smart contract corresponds to the to-be-executed transaction, it may be determined whether the instruction information of the to-be-executed transaction sent by the another node and used for executing the smart contract has been received.

If it is determined that the to-be-executed transaction sent by the another node in the blockchain system and used for executing the smart contract has been received, it may indicate that the another node have processed the to-be-executed transaction of the smart contract. Therefore, it may indicate that the execution of the smart contract by the executing body is out of sync with other nodes. In this regard, the executing body may not need to execute the to-be-executed transaction corresponding to the smart contract again, so as to avoid repeated execution of the to-be-executed transaction corresponding to the smart contract and so on.

Step 202, in response to determining that the to-be-executed transaction submitted by the another node has not been received, generating, a to-be-executed transaction corresponding to the current node, and sending the generated to-be-executed transaction to the blockchain system.

In the present embodiment, the method for sending the generated to-be-executed transaction may be different depending on the blockchain system. For example, in some blockchain systems, each node may directly communicate with the other nodes. In this regard, the executing body may send the generated to-be-executed transaction to each node in the blockchain system. In some blockchain systems, each node may only communicate with several neighboring nodes. In this regard, the executing body may send the generated to-be-executed transaction to the several neighboring nodes. Then, the nodes adjacent to the executing body may send the received to-be-executed transaction to several neighboring nodes. Through continuous spread between the nodes, the to-be-executed transaction may be sent to the entire blockchain system.

Alternatively, when generating the to-be-executed transaction, a to-be-executed identifier for identifying the to-be-executed transaction may be generated at the same time.

Alternatively, the to-be-executed identifier may be generated based on a contract identifier and an execution identifier used to identify the smart contract. The contract identifier may be generated based on a user identifier of the user, so that different contract identifier may be obtained more conveniently for different users. The execution identifier may be determined based on preset execution information of the smart contract. The execution information may include at least one of: executing moment, number of times of execution, execution time interval, or the like.

Alternatively, when each node in the blockchain system receives a to-be-executed transaction, it may first determine whether the received to-be-executed transaction is an abnormal to-be-executed transaction, so as to avoid malicious submission of the to-be-executed transaction. Polarity verification may be performed on the to-be-executed transaction based on various information included in the to-be-executed transaction to determine whether the received to-be-executed transaction is an abnormal to-be-executed transaction.

Alternatively, the to-be-executed transaction may include signature information of the current node.

Step 203, performing consensus with the another node on the to-be-executed transaction corresponding to the smart contract.

In the present embodiment, various existing consensus mechanisms may be used to perform consensus on the to-be-executed transaction corresponding to the smart contract. For example, Proof of Work (POW), Proof of Stake (POS), Byzantine Fault Tolerance (BFT), etc. Different blockchain systems may use different consensus mechanisms.

Through the consensus of each node in the blockchain system on the to-be-executed transaction corresponding to the smart contract, the consistency of an execution sequence of the to-be-executed transaction corresponding to the smart contract by each node may be guaranteed. In other words, it may be guaranteed that each node executes the to-be-executed transaction corresponding to the smart contract after the execution of a certain transaction ends.

The consensus mechanism is a well-known technology that is currently widely studied and applied, and detailed description thereof will be omitted.

Step 204, obtaining and executing the smart contract according to the to-be-executed transaction on which the consensus is performed.

In the present embodiment, after each node in the blockchain system performs the consensus on the to-be-executed transaction corresponding to the smart contract, the smart contract corresponding to the to-be-executed transaction may be obtained and the smart contract is executed. It should be understood that each node in the blockchain system needs to be consistent in the execution of the smart contract. Therefore, while the executing body executes the smart contract, the other nodes may also execute the smart contract to realize the synchronization of the execution of the smart contract by respective nodes.

Alternatively, the to-be-executed transaction may be executed in an execution order on which the consensus is performed to record the to-be-executed transaction on which the consensus is performed. It should be understood that the execution of the to-be-executed transaction by each node in the blockchain system is also consistent. Therefore, while the executing body executes the to-be-executed transaction, another node may also execute the to-be-executed transaction to record the to-be-executed transaction on which the consensus is performed.

Alternatively, a submission transaction for submitting the smart contract may be recorded through the following steps.

Step one, receiving a submission transaction for submitting the smart contract.

In this step, the executing body may directly receive the submission transaction of the smart contract submitted by the user who develops the smart contract. In some cases, another node may receive the submission transaction submitted by the user who develops the smart contract. In this regard, the executing body may receive the submission transaction of the smart contract sent by the another node.

The submission transaction may include preset executing moment for executing the smart contract.

Alternatively, the submission transaction further includes at least one of: the smart contract, a contract identifier for identifying the smart contract, preset permission node information, a preset number of times for execution, or a preset execution time interval.

The permission node information may be used to indicate the permission node of the smart contract. The permission node of the smart contract may be preset by the user. The number of permission nodes may also be set by the user according to actual application requirements. Different smart contracts may set different permission nodes correspondingly. For example, the user may preset the node whose contract identifier ends with 0 as the permission node.

Generally, the number of permission nodes cannot be too small to avoid problems such as single point of failure.

As a result, the nodes in the blockchain system may be divided into permission nodes and non-permission nodes, and the permission nodes and non-permission nodes may be controlled to perform different operations according to actual application requirements.

It should be understood that the content of the submission transaction of the smart contract may be flexibly set by the user according to actual application requirements.

Step two, determining whether the submission transaction is an abnormal submission transaction.

In this step, the security of the submission transaction may be judged, to avoid situations such as maliciously sent submission transactions, which may cause damage to the blockchain system. According to the content of the submission transaction, different methods may be selected to verify the submission transaction to determine whether the submission transaction is an abnormal submission transaction.

Alternatively, when the submission transaction includes the contract identifier for identifying the smart contract, whether the contract identifier is unique may be determined. If the contract identifier is not unique, it may be determined that the submission transaction is an abnormal submission transaction.

Alternatively, when the submission transaction includes the permission node information, it may be determined whether the submission transaction is an abnormal submission transaction by determining whether the permission node information meets a preset condition. If it is determined that the permission node information does not meet the preset condition, it may be determined whether the submission transaction is an abnormal submission transaction. The preset condition may be flexibly set according to different application scenarios. For example, the preset condition may include a value range of the number of permission nodes.

Alternatively, when the submission transaction includes the number of times of execution and/or execution time interval, whether the submission transaction is an abnormal submission transaction may be determined by determining whether the number of times of execution meets a preset value range of the number of times of execution, and/or determining whether the execution time interval meets a preset value range of execution time interval. The value range of the number of times of execution and the value range of execution time interval may be preset according to actual application scenarios. If it is determined that the number of times of execution does not meet the preset value range of the number of times of execution, and/or it is determined that the execution time interval does not meet the preset value range of execution time interval, it may be determined that the submission transaction is an abnormal submission transaction.

By controlling the preset number of times of execution and the execution time interval, problems such as too many number of times of execution and too short execution time intervals affecting the execution of other smart contracts may be avoided.

Step three, sending, in response to determining that the submission transaction is not an abnormal submission transaction, the submission transaction to the blockchain system.

Step four, performing consensus with the other nodes on the submission transaction corresponding to the smart contract.

In this step, through the consensus of each node in the blockchain system on the submission transaction corresponding to the smart contract, the consistency of an execution sequence of the submission transaction corresponding to the smart contract by each node may be guaranteed. In other words, it may be guaranteed that each node executes the submission transaction corresponding to the smart contract after the execution of a certain transaction ends.

Step five, performing the submission transaction on which the consensus is performed to record the submission transaction on which the consensus is performed. It should be understood that the execution of the submission transaction corresponding to the smart contract by each node in the blockchain system is also consistent. Therefore, while the executing body executes the submission transaction, the other nodes may also execute the submission transaction to record the submission transaction on which the consensus is performed.

Through the execution of the submission transaction of the smart contract, each node in the blockchain system may record some information of the smart contract included in the submission transaction to facilitate the subsequent execution of the smart contract.

For example, the contract identifier may be included in the submission transaction. In this regard, each node may distinguish different smart contracts by recording the contract identifier.

As another example, the submission transaction may include the preset executing moment, the number of times of execution, the execution time interval, etc. of the smart contract. In this regard, each node may poll to determine whether the executing moment of the smart contract is reached by recording the preset executing moment, number of times of execution, execution time interval, etc. of the smart contract, and complete effective execution of the smart contract based on the preset number of times of execution and execution time interval.

As another example, the submission transaction may include the permission node information. In this regard, each node may verify whether the node sending the submission transaction is a permission node.

Alternatively, in the method provided by the above embodiments of the present disclosure, at the execution time of the smart contract, if the node in the blockchain system determines that the to-be-executed transaction corresponding to the smart contract submitted by another node has not been received, the to-be-executed transaction corresponding to the current node is generated and sent to the blockchain system, and then each node performs consensus on the to-be-executed transaction corresponding to the smart contract, and completes the timing execution of the smart contract according to the to-be-executed transaction on which the consensus is performed, so as to realize that each node in the blockchain system automatically completes the timing execution of the smart contract according to the to-be-executed transaction, avoiding the problem that the execution of the smart contract is not synchronized due to the inconsistency of the clocks of the nodes, and the nodes execute the smart contract according to their own clock.

With further reference to FIG. 3, illustrating a flow 30) of another embodiment of the method for executing a smart contract. The flow 300 of the method for executing a smart contract includes the following steps.

Step 301, determining whether the current node belongs to a preset permission node of the smart contract.

In the present embodiment, the executing body may locally store a corresponding relationship between the smart contract and its corresponding preset permission node in advance. In this regard, it may determine whether the current node belongs to the preset permission node of the smart contract by determining whether the current node is included in the preset permission node corresponding to the smart contract.

Alternatively, if the executing body has previously executed the submission transaction of the smart contract that includes the permission node information, the executing body records the permission node information corresponding to the smart contract. In this regard, the executing body may determine whether the current node belongs to the preset permission node of the smart contract based on the pre-recorded permission node information.

For the related content of the permission node and the permission node information, reference may be made to the related description of the permission node in the corresponding embodiment of FIG. 2, and repeated description thereof will be omitted.

Step 302, determining, in response to determining that the current node belongs to the preset permission node of the smart contract, whether the preset executing moment for executing the smart contract is reached.

In the present embodiment, the permission node of the smart contract may pre-store the corresponding relationship between the smart contract and its corresponding executing moment locally. In this regard, the executing body may poll whether the executing moment for executing the smart contract is reached according to the preset time interval. Non-permission nodes do not need to detect the executing moment of the smart contract, so as to reduce resource consumption during the execution of the smart contract.

Step 303, determining, in response to determining that the preset executing moment for executing the smart contract is reached, whether the to-be-executed transaction sent by the another node in the blockchain system and used for executing the smart contract has been received.

Step 304, in response to determining that the to-be-executed transaction submitted by the another node has not been received, generating a to-be-executed transaction corresponding to the current node, and sending the generated to-be-executed transaction to the blockchain system.

In the present embodiment, sending the generated to-be-executed transaction to a non-permission node in the blockchain system, to cause the non-permission node to execute following steps.

Step one, determining whether the node sending the to-be-executed transaction belongs to the preset permission node of the smart contract.

In this step, the executing body may locally pre-store an identifier of the permission node of the smart contract. In this regard, it may be determined whether the node sending the to-be-executed transaction belongs to the preset permission node of the smart contract based on the identifier of the node sending the to-be-executed transaction.

Alternatively, the to-be-executed transaction may include signature information of the node that generates the to-be-executed transaction. At the same time, each node in the blockchain system may pre-store the signature information of the permission node of the smart contract. In this regard, whether the node sending the to-be-executed transaction belongs to the preset permission node of the smart contract may be determined by judging whether the signature information included in the received to-be-executed transaction belongs to the pre-stored signature information of the permission node of the smart contract.

Step two, in response to determining that the node sending the to-be-executed transaction belongs to the preset permission node of the smart contract, determining whether the to-be-executed transaction sent by another node in the blockchain system has been received, and/or whether the consensus has been performed with the another node on the to-be-executed transaction corresponding to the smart contract.

If it is determined that the to-be-executed transaction sent by the another node in the blockchain system has been received, and/or the consensus has been performed with the another node on the to-be-executed transaction corresponding to the smart contract, it may indicate that the another node has processed the to-be-executed transaction corresponding to the smart contract, and the execution of the smart contract by the non-permission node is no longer synchronized with other nodes. In this regard, the non-permission node may not need to execute the to-be-executed transaction corresponding to the smart contract again, so as to avoid repeated execution of the to-be-executed transaction corresponding to the smart contract and so on.

Step three, sending, in response to determining that the to-be-executed transaction submitted by the another node has not been received, and/or determining that the consensus has not been performed with the another node on the to-be-executed transaction corresponding to the smart contract, the received to-be-executed transaction to the blockchain system.

Step four, performing consensus with the another node on the to-be-executed transaction corresponding to the smart contract. Therefore, through the consensus of each node in the blockchain system on the to-be-executed transaction corresponding to the smart contract, the consistency of an execution sequence of the to-be-executed transaction corresponding to the smart contract by each node may be guaranteed.

Step 305, performing consensus with the another node on the to-be-executed transaction corresponding to the smart contract.

Step 306, obtaining and executing the smart contract according to the to-be-executed transaction on which the consensus is performed.

For the execution process of the foregoing steps 305 and 306, reference may be made to the related descriptions of steps 203 and 204 in the corresponding embodiment in FIG. 2, and repeated description thereof will be omitted.

The method provided by the above embodiment of the present disclosure generates the to-be-executed transaction of the smart contract and sends to the blockchain system by controlling the permission node in the blockchain system at the execution moment of the smart contract and when the to-be-executed transaction submitted the another node has not been received. Then, each node in the blockchain system performs consensus and executes the to-be-executed transaction of the smart contract to complete the execution of the smart contract. As a result, the number of nodes that generate the to-be-executed transaction of the smart contract may be reduced, thereby reducing a network communication pressure of the blockchain system, and avoiding network storms and other situations.

Figure 4:
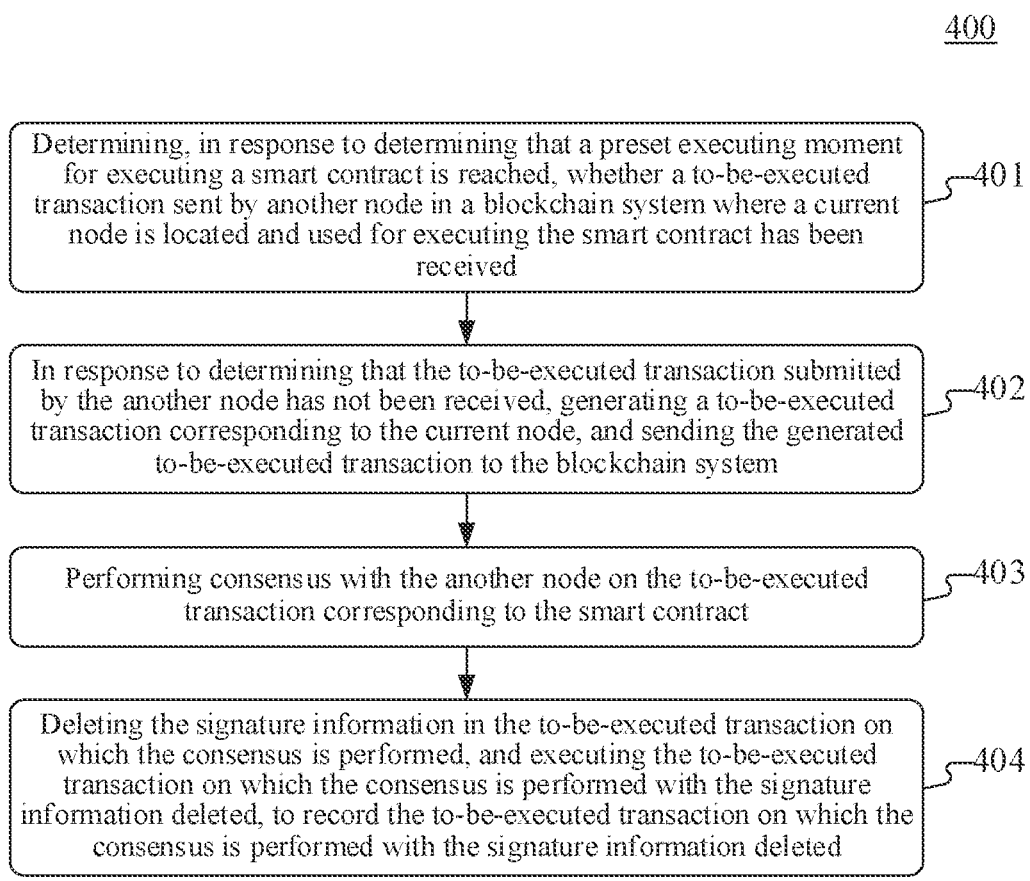
FIG. 4 is a flowchart of another embodiment of the method for executing a smart contract according to the present disclosure.

With further reference to FIG. 4, illustrating a flow 400 of another embodiment of the method for executing a smart contract. The flow 400 of the method for executing a smart contract includes the following steps.

Step 401, determining, in response to determining that a preset executing moment for executing a smart contract is reached, whether a to-be-executed transaction sent by another node in a blockchain system and used for executing the smart contract has been received.

In this step, when the node in the blockchain system sends the to-be-executed transaction of the smart contract, the node may add its own signature information to the to-be-executed transaction. After that, a source of the to-be-executed transaction may also be verified based on the signature information to ensure the correctness of the to-be-executed transaction.

Step 402, in response to determining that the to-be-executed transaction submitted by the another node has not been received, generating a to-be-executed transaction corresponding to a current node, and sending the generated to-be-executed transaction to the blockchain system.

In this step, the executing body may add the signature information of the current node to the to-be-executed transaction when generating the corresponding to-be-executed transaction.

Step 403, performing consensus with the another node on the to-be-executed transaction corresponding to the smart contract.

For the execution process of the content other than the signature information in the foregoing steps 401, 402, and 403, reference may be made to the relevant descriptions of the steps 201, 202, and 203 in the corresponding embodiment of FIG. 2, and repeated description thereof will be omitted.

Step 404, deleting the signature information in the to-be-executed transaction on which the consensus is performed, and executing the to-be-executed transaction on which the consensus is performed with the signature information deleted, to record the to-be-executed transaction on which the consensus is performed with the signature information deleted.

For different nodes in the blockchain system, since the node that generates the consensus to-be-executed transaction may be different, the signature information in the to-be-executed transaction on which the consensus is performed recorded by the nodes may be different. Based on this, if the to-be-executed transaction including the signature information is directly executed, the to-be-executed transaction recorded by the nodes may be inconsistent.

The method for executing a smart contract in the present embodiment, by deleting the signature information in the to-be-executed transaction before executing the to-be-executed transaction, it may ensure the consistency of the execution of the to-be-executed transaction by each node, and avoid the inconsistency of the to-be-executed transaction recorded by each node.

Figure 5:
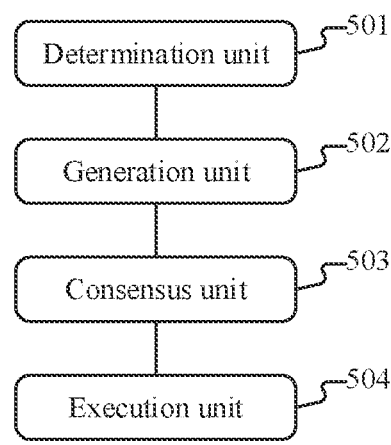
FIG. 5 is a schematic structural diagram of an embodiment of an apparatus for executing a smart contract according to the present disclosure.

With further reference to FIG. 5, as an implementation of the method shown in the above figures, the present disclosure provides an embodiment of an apparatus for executing a smart contract. The apparatus embodiment corresponds to the method embodiment as shown in FIG. 2. The apparatus may be applied to various electronic devices.

As shown in FIG. 5, an apparatus 500 for executing a smart contract provided by the present embodiment includes: a determination unit 501, a generation unit 502, a consensus unit 503 and an execution unit 504. The determination unit is configured to determine, in response to determining that a preset executing moment for executing a smart contract is reached, whether a to-be-executed transaction sent by another node in a blockchain system where a current node is located and used for executing the smart contract has been received; the generation unit is configured to, in response to determining that the to-be-executed transaction submitted by the another node has not been received, generate a to-be-executed transaction corresponding to the current node, and send the generated to-be-executed transaction to the blockchain system; the consensus unit is configured to perform consensus with the another node on the to-be-executed transaction corresponding to the smart contract; and the execution unit is configured to obtain and execute the smart contract according to the to-be-executed transaction on which the consensus is performed.

In the present embodiment, in the apparatus 500 for executing a smart contract: for the specific processing and the technical effects of the determination unit 501, the generation unit 502, the consensus unit 503 and the execution unit 504, reference may be made to the relevant descriptions of step 201, step 202, step 203 and step 204 in the embodiment corresponding to FIG. 2 respectively, and repeated description thereof will be omitted.

In some alternative implementations of the present embodiment, the determination unit 501 is configured to determine, in response to determining that a preset executing moment for executing a smart contract is reached, whether a to-be-executed transaction sent by another node in a blockchain system and used for executing the smart contract has been received. The generation unit 502 is configured to generate, in response to determining that the to-be-executed transaction submitted by the another node has not been received, a to-be-executed transaction corresponding to the current node, and send the generated to-be-executed transaction to the blockchain system. The consensus unit 503 is configured to perform consensus with the another node on the to-be-executed transaction corresponding to the smart contract. The execution unit 504 is configured to obtain and execute the smart contract according to the to-be-executed transaction on which the consensus is performed.

In some alternative implementations of the present embodiment, the determination unit 501 is further configured to: determine whether the current node belongs to a preset permission node of the smart contract; determine, in response to determining that the current node belongs to the preset permission node of the smart contract, whether the preset executing moment for executing the smart contract is reached; and determine, in response to determining that the preset executing moment for executing the smart contract is reached, whether the to-be-executed transaction sent by the another node in the blockchain system and used for executing the smart contract has been received.

In some alternative implementations of the present embodiment, the generation unit 502 is further configured to: send the generated to-be-executed transaction to a non-permission node in the blockchain system, to cause the non-permission node to execute following operations: determining whether the node sending the to-be-executed transaction belongs to the preset permission node of the smart contract; in response to determining that the node sending the to-be-executed transaction belongs to the preset permission node of the smart contract, determining whether the to-be-executed transaction sent by the another node in the blockchain system has been received, and/or whether the consensus has been performed with the another node on the to-be-executed transaction corresponding to the smart contract; sending, in response to determining that the to-be-executed transaction submitted by the another node has not been received, and/or determining that the consensus has not been performed with the another node on the to-be-executed transaction corresponding to the smart contract, the received to-be-executed transaction to the blockchain system; and performing consensus with the another node on the to-be-executed transaction corresponding to the smart contract.

In some alternative implementations of the present embodiment, the execution unit 504 is further configured to: perform the to-be-executed transaction on which the consensus is performed to record the to-be-executed transaction on which the consensus is performed.

In some alternative implementations of the present embodiment, the to-be-executed transaction includes signature information of the node that generates the to-be-executed transaction; and the execution unit 504 is further configured to: delete the signature information in the to-be-executed transaction on which the consensus is performed, and execute the to-be-executed transaction on which the consensus is performed with the signature information deleted, to record the to-be-executed transaction on which the consensus is performed with the signature information deleted.

In some alternative implementations of the present embodiment, the apparatus further includes: a receiving unit (not shown in the figure), configured to receive a submission transaction for submitting the smart contract, where the submission transaction includes the preset executing moment for executing the smart contract; the determination unit 501 is further configured to: determine whether the submission transaction is an abnormal submission transaction. The apparatus further includes a sending unit (not shown in the figure), configured to send, in response to determining that the submission transaction is not an abnormal submission transaction, the submission transaction to the blockchain system. The consensus unit 503 is further configured to: perform consensus with the another node on the submission transaction corresponding to the smart contract; and the execution unit 504 is further configured to: perform the submission transaction on which the consensus is performed to record the submission transaction on which the consensus is performed.

In the apparatus provided by the above embodiment of the present disclosure, the determination unit determines, in response to determining that a preset executing moment for executing a smart contract is reached, whether a to-be-executed transaction sent by another node in a blockchain system where the current node is located and used for executing the smart contract has been received. The generation unit generates, in response to determining that the to-be-executed transaction submitted by the another node has not been received, a to-be-executed transaction corresponding to a current node, and sends the generated to-be-executed transaction to the blockchain system. The consensus unit performs consensus with the another node on the to-be-executed transaction corresponding to the smart contract. The execution unit obtains and executes the smart contract according to the to-be-executed transaction on which the consensus is performed. As a result, each node in the blockchain system may complete the timing execution of the smart contract based on the to-be-executed transaction, while also ensuring the synchronization of the execution of the smart contract by each node.

The method and apparatus for executing a smart contract provided by the embodiments of the present disclosure, through a node in the blockchain system at an executing moment for executing the smart contract, if it is determined that a to-be-executed transaction of the smart contract submitted by another node has not been received, the to-be-executed transaction corresponding to the current node is generated and sent to the blockchain system, then each node performs consensus on the to-be-executed transaction corresponding to the smart contract, and completes timing execution of the smart contract according to the to-be-executed transaction on which the consensus is performed. This eliminates the need for a business system at a user-side to actively call the blockchain system at the executing moment for executing the smart contract. Instead, each node in the blockchain system completes the timing execution of the smart contract according to the to-be-executed transaction. At the same time, this method shields the problem of inconsistent clocks of the nodes, that is, even if the clocks of the nodes are inconsistent, it may also ensure the synchronization of the execution of the smart contract by the nodes.

Figure 6:
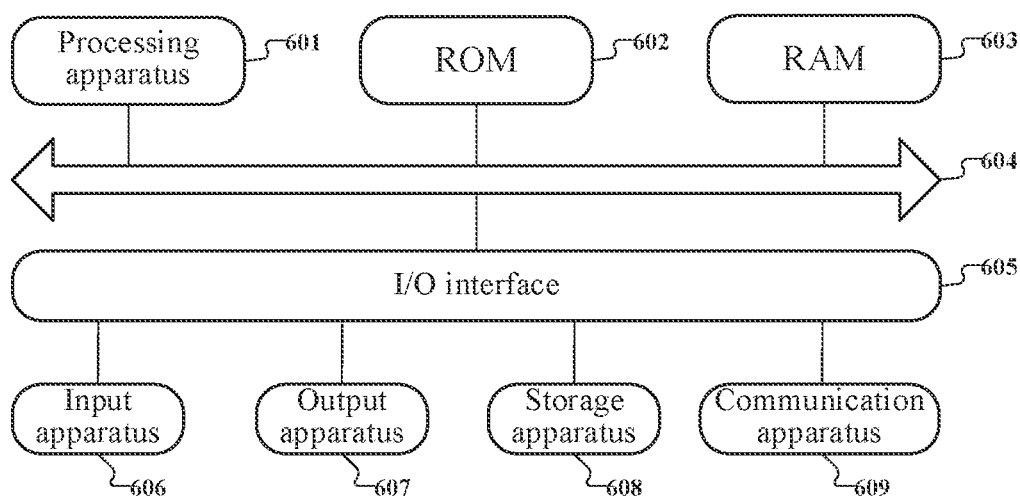
FIG. 6 is a schematic structural diagram of an electronic device adapted to implement embodiments of the present disclosure.

Reference is now made to FIG. 6, which shows a schematic structural diagram of an electronic device (for example, a node in the blockchain system 105 in FIG. 1) 600 adapted to implement embodiments of the present disclosure. The electronic device shown in FIG. 6 is only an example, and should not bring any limitation to the function and scope of use of the embodiments of the present disclosure.

As shown in FIG. 6, the electronic device 600 includes a processing apparatus (such as Center Processing Unit, and Graphics Processing Unit) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatus may be connected to the I/O interface 605: an input apparatus 606 including a touch screen, a touchpad, a keyboard, a mouse, a camera, a microphone, an accelerometer, a gyroscope, or the like; an output apparatus 607 including a liquid crystal display (LCD), a speaker, a vibrator, or the like; a storage apparatus 608 including, for example, a magnetic tape, a hard disk, or the like; and a communication apparatus 609. The Communication apparatus 609 may allow electronic device 600 to wirelessly or wirelessly communicate with other devices to exchange data. Although FIG. 6 illustrates an electronic device 600 having various devices, it should be understood that not all apparatus are required to be implemented or shown. More or fewer devices may alternatively be implemented or provided. Each block shown in FIG. 6 may represent one device or multiple apparatus as desired.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the above-mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above computer readable medium may be included in the electronic device; or may alternatively be present alone and not assembled into the electronic device. The computer readable medium carries one or more programs that, when executed by the electronic device, cause the electronic device to: determine, in response to determining that a preset executing moment for executing a smart contract is reached, whether a to-be-executed transaction sent by another node in a blockchain system where a current node is located and used for executing the smart contract has been received; in response to determining that the to-be-executed transaction submitted by the another node has not been received, generate a to-be-executed transaction corresponding to the current node, and send the generated to-be-executed transaction to the blockchain system; perform consensus with the another node on the to-be-executed transaction corresponding to the smart contract; and obtain and execute the smart contract according to the to-be-executed transaction on which the consensus is performed.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor, including a determination unit, a generation unit, a consensus unit and an execution unit, where the names of these units do not constitute a limitation to such units themselves in some cases. For example, the determination unit may alternatively be described as "a unit for determining, in response to determining that a preset executing moment for executing a smart contract is reached, whether a to-be-executed transaction sent by another node in a blockchain system where a current node is located and used for executing the smart contract has been received".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for executing a smart contract, wherein the method is performed by a node in a blockchain system and the method comprises:
   determining whether the node belongs to a preset permission node of the smart contract;
   determining, in response to determining that the node belongs to the preset permission node of the smart contract, whether a preset executing moment for executing the smart contract is reached;
   determining, in response to determining that the preset executing moment for executing the smart contract is reached, whether a to-be-executed transaction sent by another node in the blockchain system and used for executing the smart contract has been received;
   in response to determining that the to-be-executed transaction submitted by the another node has not been received, generating a to-be-executed transaction corresponding to the node, and sending the generated to-be-executed transaction to the blockchain system;
   performing consensus with the another node on the to-be-executed transaction corresponding to the smart contract; and
   obtaining and executing the smart contract according to the to-be-executed transaction on which the consensus is performed.

2. The method according to claim 1, wherein the sending the generated to-be-executed transaction to the blockchain system, comprises:
   sending the generated to-be-executed transaction to a non-permission node in the blockchain system, to cause the non-permission node to execute following operations:
   determining whether the node sending the to-be-executed transaction belongs to the preset permission node of the smart contract;
   in response to determining that the node sending the to-be-executed transaction belongs to the preset permission node of the smart contract, determining whether the to-be-executed transaction sent by the another node in the blockchain system has been received, and/or whether the consensus has been performed with the another node on the to-be-executed transaction corresponding to the smart contract;
   sending, in response to determining that the to-be-executed transaction submitted by the another node has not been received, and/or determining that the consensus has not been performed with the another node on the to-be-executed transaction corresponding to the smart contract, the received to-be-executed transaction to the blockchain system; and
   performing consensus with the another node on the to-be-executed transaction corresponding to the smart contract.

3. The method according to claim 1, wherein the method further comprises:
   performing the to-be-executed transaction on which the consensus is performed to record the to-be-executed transaction on which the consensus is performed.

4. The method according to claim 3, wherein the to-be-executed transaction comprises signature information of the node that generates the to-be-executed transaction; and the performing the to-be-executed transaction on which the consensus is performed to record the to-be-executed transaction on which the consensus is performed, comprises:

deleting the signature information in the to-be-executed transaction on which the consensus is performed, and executing the to-be-executed transaction on which the consensus is performed with the signature information deleted, to record the to-be-executed transaction on which the consensus is performed with the signature information deleted.

5. The method according to claim 1, wherein the method further comprises:

receiving a submission transaction for submitting the smart contract, wherein the submission transaction comprises the preset executing moment for executing the smart contract;

determining whether the submission transaction is an abnormal submission transaction;

sending, in response to determining that the submission transaction is not an abnormal submission transaction, the submission transaction to the blockchain system;

performing consensus with the another node on the submission transaction corresponding to the smart contract; and performing the submission transaction on which the consensus is performed to record the submission transaction on which the consensus is performed.

6. The method according to claim 5, wherein the submission transaction further comprises at least one of: the smart contract, a contract identifier for identifying the smart contract, preset permission node information, a preset number of times of execution, or a preset execution time interval.

7. An apparatus for executing a smart contract, the apparatus comprising:

one or more processors; and a storage apparatus storing one or more programs thereon;

wherein the one or more programs, when executed by the one or more processors, cause the one or more processors to perform operations, comprising:

determining whether a current node belongs to a preset permission node of the smart contract;

determining, in response to determining that the current node belongs to the preset permission node of the smart contract, whether a preset executing moment for executing the smart contract is reached;

determining, in response to determining that the preset executing moment for executing the smart contract is reached, whether a to-be-executed transaction sent by another node in a blockchain system where the current node is located and used for executing the smart contract has been received;

in response to determining that the to-be-executed transaction submitted by the another node has not been received, generating a to-be-executed transaction corresponding to the current node, and sending the generated to-be-executed transaction to the blockchain system;

performing consensus with the another node on the to-be-executed transaction corresponding to the smart contract; and obtaining and execute the smart contract according to the to-be-executed transaction on which the consensus is performed.

8. The apparatus according to claim 7, wherein the sending the generated to-be-executed transaction to the blockchain system, comprises:

sending the generated to-be-executed transaction to a non-permission node in the blockchain system, to cause the non-permission node to execute following operations:

determining whether the node sending the to-be-executed transaction belongs to the preset permission node of the smart contract;

in response to determining that the node sending the to-be-executed transaction belongs to the preset permission node of the smart contract, determining whether the to-be-executed transaction sent by the another node in the blockchain system has been received, and/or whether the consensus has been performed with the another node on the to-be-executed transaction corresponding to the smart contract;

sending, in response to determining that the to-be-executed transaction submitted by the another node has not been received, and/or determining that the consensus has not been performed with the another node on the to-be-executed transaction corresponding to the smart contract, the received to-be-executed transaction to the blockchain system; and performing consensus with the another node on the to-be-executed transaction corresponding to the smart contract.

9. The apparatus according to claim 7, wherein the operations further comprise: performing the to-be-executed transaction on which the consensus is performed to record the to-be-executed transaction on which the consensus is performed.

10. The apparatus according to claim 9, wherein the to-be-executed transaction comprises signature information of the node that generates the to-be-executed transaction; and the performing the to-be-executed transaction on which the consensus is performed to record the to-be-executed transaction on which the consensus is performed, comprises: deleting the signature information in the to-be-executed transaction on which the consensus is performed, and executing the to-be-executed transaction on which the consensus is performed with the signature information deleted, to record the to-be-executed transaction on which the consensus is performed with the signature information deleted.

11. The apparatus according to claim 7, wherein the operations further comprise: receiving a submission transaction for submitting the smart contract, wherein the submission transaction comprises the preset executing moment for executing the smart contract;

determining whether the submission transaction is an abnormal submission transaction;

sending, in response to determining that the submission transaction is not an abnormal submission transaction, the submission transaction to the blockchain system;

performing consensus with the another node on the submission transaction corresponding to the smart contract; and performing the submission transaction on which the consensus is performed to record the submission transaction on which the consensus is performed.

12. The apparatus according to claim 11, wherein the submission transaction further comprises at least one of: the smart contract, a contract identifier for identifying the smart contract, preset permission node information, a preset number of times of execution, or a preset execution time interval.

13. A non-transitory computer-readable medium storing a computer program thereon, wherein the program, when executed by a processor, causes the processor to perform operations, comprising:

- determining whether a current node belongs to a preset permission node of the smart contract;
- determining, in response to determining that the current node belongs to the preset permission node of the smart contract, whether a preset executing moment for executing the smart contract is reached;
- determining, in response to determining that the preset executing moment for executing the smart contract is reached, whether a to-be-executed transaction sent by another node in a blockchain system where the current node is located and used for executing the smart contract has been received;
- in response to determining that the to-be-executed transaction submitted by the another node has not been received, generating a to-be-executed transaction corresponding to the current node, and sending the generated to-be-executed transaction to the blockchain system;
- performing consensus with the another node on the to-be-executed transaction corresponding to the smart contract; and
- obtaining and execute the smart contract according to the to-be-executed transaction on which the consensus is performed.

* * * * *